(12) United States Patent
Umeki et al.

(10) Patent No.: US 11,485,208 B2
(45) Date of Patent: Nov. 1, 2022

(54) SUNROOF DEFLECTOR ASSEMBLY

(71) Applicant: AISIN TECHNICAL CENTER OF AMERICA, INC., Northville, MI (US)

(72) Inventors: Takayuki Umeki, Novi, MI (US); Scott Cullen, Northville, MI (US); Adam Nankee, Northville, MI (US); Lindsey Blair, Northville, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 17/217,566

(22) Filed: Mar. 30, 2021

(65) Prior Publication Data
US 2022/0314760 A1    Oct. 6, 2022

(51) Int. Cl.
*B60J 7/22*      (2006.01)
*B60J 7/043*     (2006.01)

(52) U.S. Cl.
CPC .................. *B60J 7/22* (2013.01); *B60J 7/043* (2013.01)

(58) Field of Classification Search
CPC .................................... B60J 7/22; B60J 7/223

USPC ......................................................... 296/217
See application file for complete search history.

(56) References Cited

FOREIGN PATENT DOCUMENTS

| CN | 108909420 A | 11/2018 |
|---|---|---|
| JP | 5360249 B2 | 12/2013 |

*Primary Examiner* — Dennis H Pedder
(74) *Attorney, Agent, or Firm* — Oblon, McClelland, Maier & Neustadt, L.L.P.

(57) ABSTRACT

A sunroof device is disclosed. A sunroof device includes a movable panel on a roof of a vehicle; a guide rail including one or more holes; a deflector holder including a first restriction portion, a second restriction portion, and a rotation center, wherein a first tip of the first restriction portion connecting to a first hole of the one or more holes; a second tip of the second restriction portion including a first claw, the first claw connecting to a second hole of the one or more holes; a third tip of the second restriction portion including a second claw, the second claw connecting to a third hole of the one or more holes, the second hole and the third hole including a front portion, a middle portion, and a rear portion, wherein a first width of the middle portion is smaller than a second width of the rear portion; the first width is smaller than a third width of the front portion; and an inner surface between the front portion and the middle portion includes an inclination.

7 Claims, 11 Drawing Sheets

SUNROOF DEFLECTOR ASSEMBLY

FIELD OF THE DISCLOSURE

This disclosure relates generally to vehicles and, more particularly, to a structure in the vehicle to restrict a movement of a sunroof deflector holder.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Sunroof deflector holder typically has rail restriction portions. The rail restriction portions are engaged with holes of guide rail of the sunroof deflector to restrict movements of the sunroof deflector holder to the rail. However, in many prior applications, because the rail restriction portions are not designed properly, the defector holder moves back and forth or left and right when the sunroof defector is erected. In order to provide a stable deflector holder when the sunroof deflector is erected, the restriction portions may need to be improved to make sure that the deflector holder is restricted.

SUMMARY

An example sunroof device may include a movable panel on a roof of a vehicle; a guide rail including one or more holes. A deflector holder may include a first restriction portion, a second restriction portion, and a rotation center, wherein a first tip of the first restriction portion connecting to a first hole of the one or more holes; a second tip of the second restriction portion including a first claw, the first claw connecting to a second hole of the one or more holes; a third tip of the second restriction portion including a second claw, the second claw connecting to a third hole of the one or more holes, the second hole and the third hole including a front portion, a middle portion, and a rear portion, wherein a first width of the middle portion is smaller than a second width of the rear portion; the first width is smaller than a third width of the front portion; and an inner surface between the front portion and the middle portion includes an inclination.

In an embodiment, the rotation center may be located at an end of the deflector holder and the first tip of the first restriction portion may be located at another end of the deflector holder.

In an embodiment, the rotation center of the deflector holder may connect to the movable panel.

In an embodiment, the second restriction portion may be located between the first restriction portion and the rotation center.

In an embodiment, the inclination may have an angle of between 17.5 degrees and 27.5 degrees, the angle being between the inner surface and a direction from the middle portion to the front portion of the deflector holder.

In an embodiment, the first claw and the second claw may connect to the rear portion at a beginning of an insertion of the first claw into the second hole and another insertion of the second claw into the third hole.

In an embodiment, the first claw and the second claw may connect to the front portion at an end of the insertion of the first claw into the second hole and the other insertion of the second claw into the third hole.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "upper," "lower," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Figure 1A:
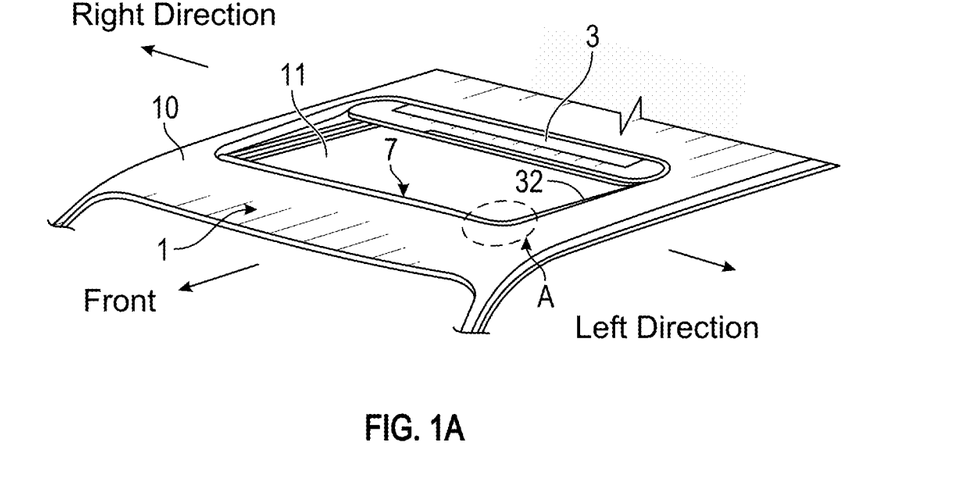
FIG. 1A is a perspective view of a roof of a vehicle with a sunroof device in accordance with the teachings of this disclosure.

FIG. 1A is a perspective view of a roof of a vehicle with the sunroof device 1 in accordance with the teachings of this disclosure. The sunroof device 1 is composed of a movable panel 3 adapted and arranged to be movable in a front-rear direction for opening or closing an opening section 11 provided on the roof 10 being an approximately horizontal flat surface and a deflector 7 adapted and arranged at an front end of the opening section 11. In FIG. 1, the direction indicated by the arrow indicates the front of the vehicle. Further, on the basis of the front shown in FIG. 1A, the left and right with a driver being seated to face the front are referred to as left direction and right direction, respectively.

The deflector 7 is mounted so as to be capable of a tilt-up movement. Specifically, the deflector 7 is mounted so as to be rotatable relative to a front portion thereof, so that an end portion thereof can be lifted up. The deflector 7 starts a tilt-up movement in coordination with an opening movement of the movable panel 3.

Figure 1B:
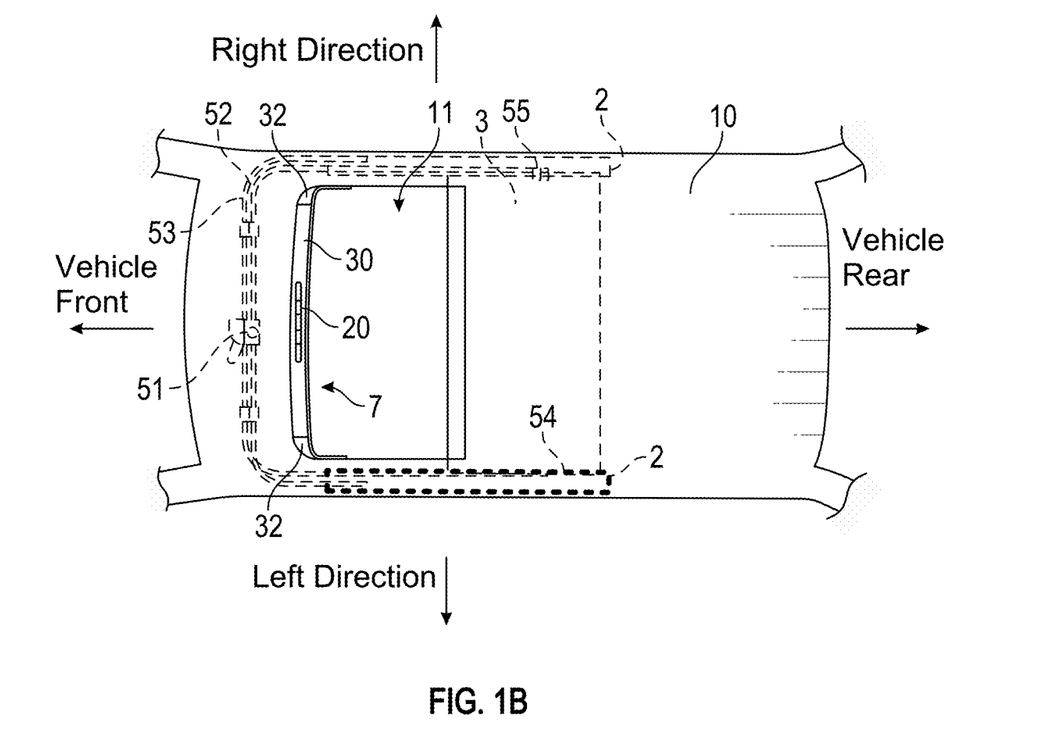
FIG. 1B is a plan view of the vehicle roof with the sunroof device in accordance with the teachings of this disclosure.

FIG. 1B is a plan view of the vehicle roof with the sunroof device in accordance with the teachings of this disclosure. As shown in FIG. 1B, the movable panel 3 is supported by guide rails 2 secured to an inner side of the roof 10 at the left and right thereof to be movable in the front-rear direction and is coupled to a drive device 5 through a cable gear 51, cables 52, 53 and connection members 54, 55, so that the movable panel 3 is constructed to operate to advance or retract by the operation of the drive device 5.

The deflector 7 is adapted and arranged to spread out over a surface of the roof 10 when the movable panel 3 is moved rearward to open the opening section 11, and to retract under the surface of the roof 10 when the movable panel 3 is moved forward to close the opening section 11.

Figure 2:
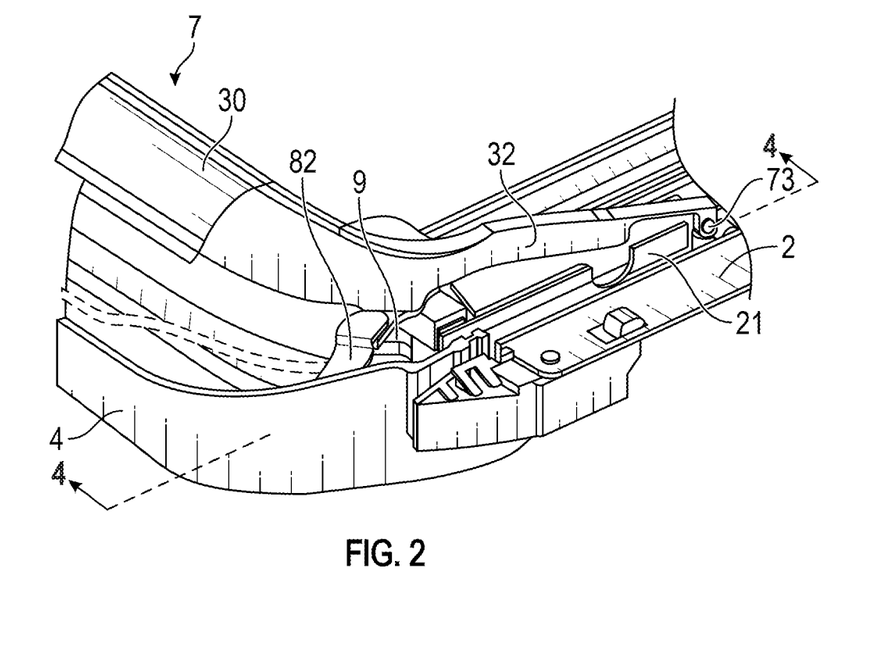
FIG. 2 is a perspective view of a portion A in FIG. 1A in accordance with the teachings of this disclosure.
Figure 3:
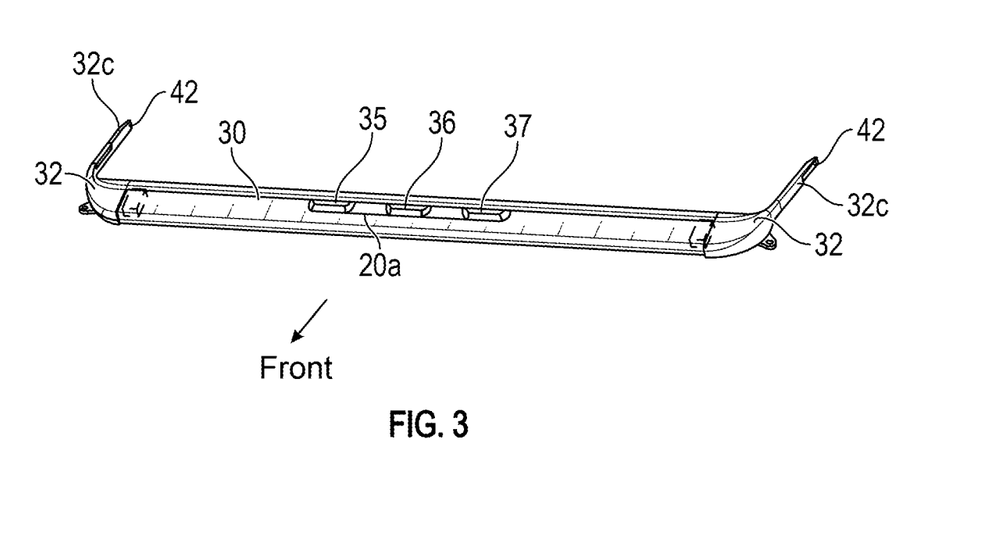
FIG. 3 is a perspective view of a deflector in accordance with the teachings of this disclosure.

FIG. 2 is a perspective view of a portion A in FIG. 1A in accordance with the teachings of this disclosure. FIG. 3 is a perspective view of a deflector in accordance with the teachings of this disclosure.

As shown in FIGS. 2 and 3, the deflector 7 is composed of resin-made support sections 32 at both ends thereof adapted to be pivotably supported by the roof 10, a tubular body section 30 made of a light metal such as aluminum or the like, extending in the width direction of the vehicle along the inner side of a front end edge portion of the opening section 11 and associated and secured at its both ends to the support sections 32, and a resin-made vortex generation member 20 having a plurality of protruding portions 35, 36, 37, which are bodily protruded from an upper surface of a resin-made, plate-like base portion 20a, and secured to an upper surface of the body section 30.

The body section 30 is formed to a tubular shape being hollow in the interior and is formed with an aluminum material by extrusion molding. The body section 30 is a member which, when the vehicle travels with the deflector 7 spreading out over the surface of the roof 10, flows the wind (air flow) flowing on the roof 10 along the upper surface portion of the body section 30 and flows the wind rearward as laminar flow not to make the wind enter the cabin.

The frame 4 is secured to connect front ends of the guide rails 2 on the both sides, and a spring 9 is attached between the frame 4 and the deflector 7 to urge the deflector 7 to be raised up. Further, the frame 4 has the contact members 82 secured thereto. In addition, an end portion of a securing portion 32 $c$ extending in the vehicle front-rear direction is attached to a bracket 21 secured to the guide rail 2, to be pivotable through a pivot shaft 73.

In an embodiment, each securing portion 32 $c$ is a member which takes a square shape in section to extend along an inner side of each side edge portion of the opening section 11, and is provided at its end portion with a bolt through hole 42 for being attached to the bracket 21 of each guide rail 2. The bracket 21 may include a deflector holder 600 which will be discussed later. The deflector holder 600 may include a first restriction portion, a second restriction portion, and a rotational center to restrict the movements of the deflector 7.

Figure 4:
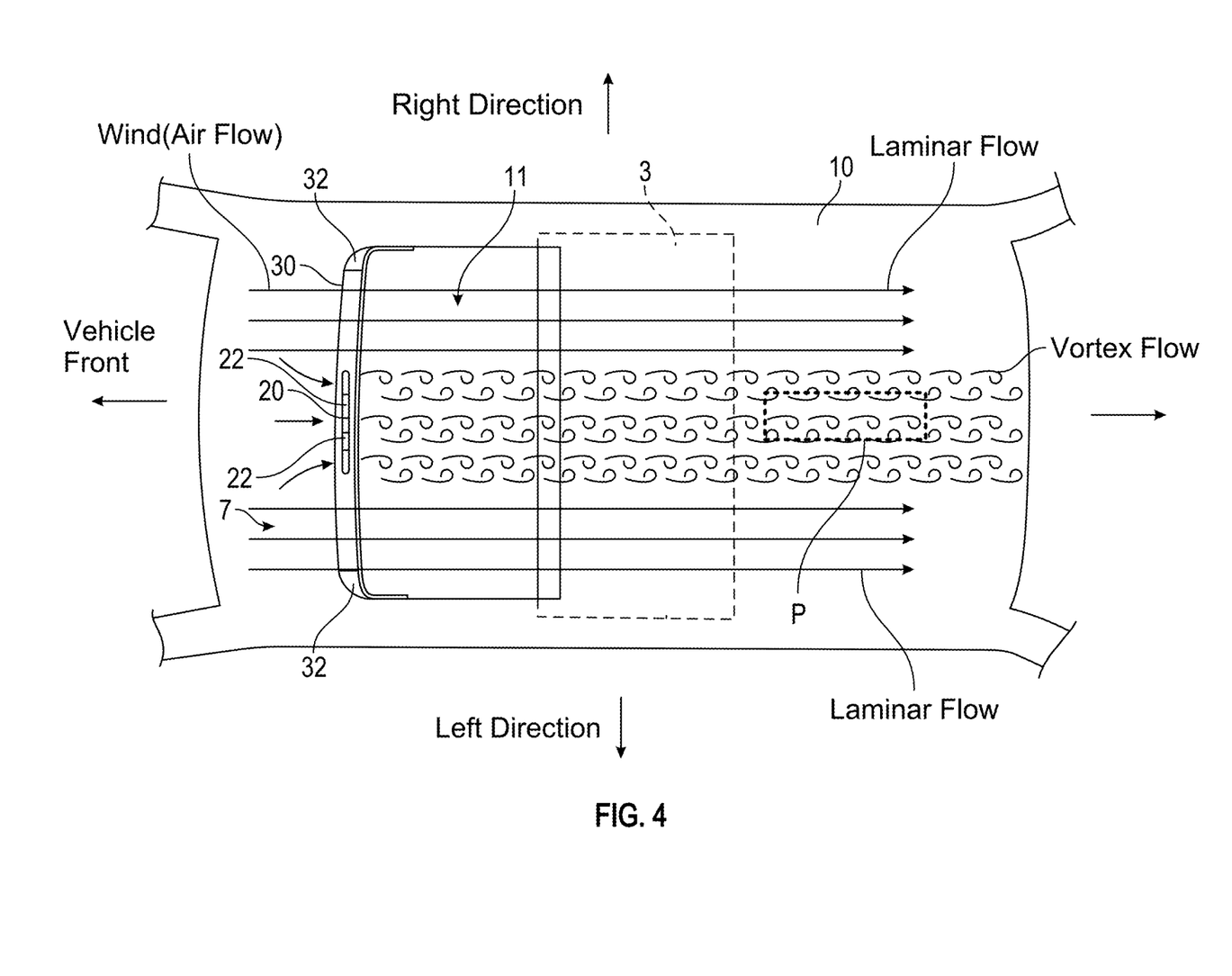
FIG. 4 is an explanatory view regarding the flow of air by the deflector in accordance with the teachings of this disclosure.

FIG. 4 is an explanatory view regarding the flow of air by the deflector in accordance with the teachings of this disclosure.

When the vehicle travels, at the body section 30 of the deflector 7 except for the part where the vortex generation member 20 is secured, as shown in FIG. 4, the wind which flows from the front end part toward the rear of the roof 10 flows from the front wall 30$d$ of the body section 30 along the upper wall a to become a laminar flow and flows almost in parallel in the vehicle front-rear direction, so that the wind passes through over the opening section 11 without entering the cabin. Further, a part of the laminar flow flows rearward as it is brought into collision with the roof 10 located behind the opening section 11. The parts of the roof with which the laminar flow is brought into collision at this time are not the low strength place P located at the center part in the left-right direction, but those parts at which a predetermined strength is secured. The flow passages are located in the passages 22. Therefore, no vibration takes place irrespective of collision with the part of the laminar flow, and hence, the generation of noise does not take place.

Figure 5:
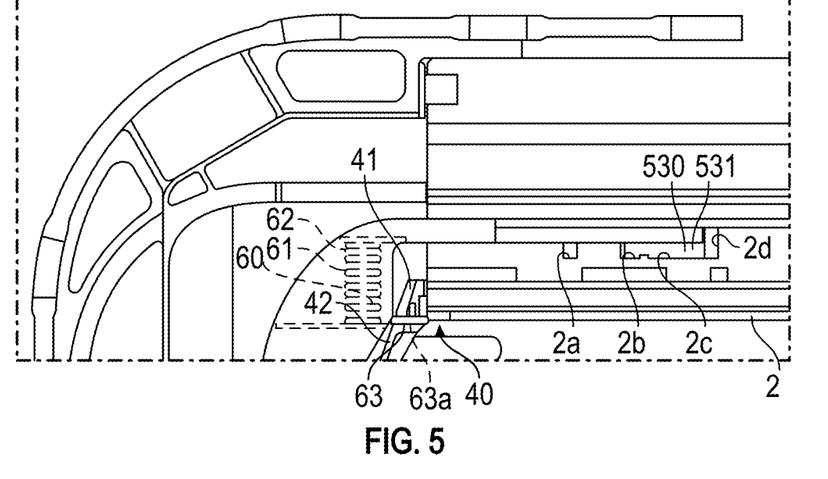
FIG. 5 is a plan view of showing an front right portion of the sunroof device of a vehicle in accordance with the teachings of this disclosure.

FIG. 5 illustrates a plan view of showing a front right portion of the sunroof device of a vehicle in accordance with the teachings of this disclosure.

In FIG. 5, rectangular locking holes 2a and 2b may be arranged side by side in a front-rear direction of the vehicle. The square locking holes 2a and 2b may be located in a front end of each guide rail 2. Rectangular locking holes 2c and 2d may be arranged side by side in a front-rear direction of the vehicle. The rectangular locking holes 2c and 2d may be open in an up-down direction of the vehicle.

In an embodiment, a holder 530 may be made by a resin material to be a support portion that engaged with the rectangular locking holes 2a to 2d fixed to the guide rail 2. The holder 530 may be protruded forward from a main body 531. The holder 530 may be protruded from a front end of the main body 531 towards inward into a left-right direction of the vehicle.

In an embodiment, a spring holding portion 40 may be located in a boundary closer to the inside in the left-right direction of the vehicle for each guide rail 2. Each spring holding portion 40 may be arranged to be shifted in the left-right direction of the vehicle with respect to the holder 530. Each spring holding portion 40 may have a first side wall portion 41 and a second side wall portion 42 arranged side by side in the left-right direction of the vehicle, and is formed in such a manner that the first side wall portion 41 may be divided into upper and lower parts except for the front end portion. The spring holding portion 40 may form a space that opens upward and in the front-rear direction of the vehicle between the first and second side wall portions 41 and 42.

Figure 6:
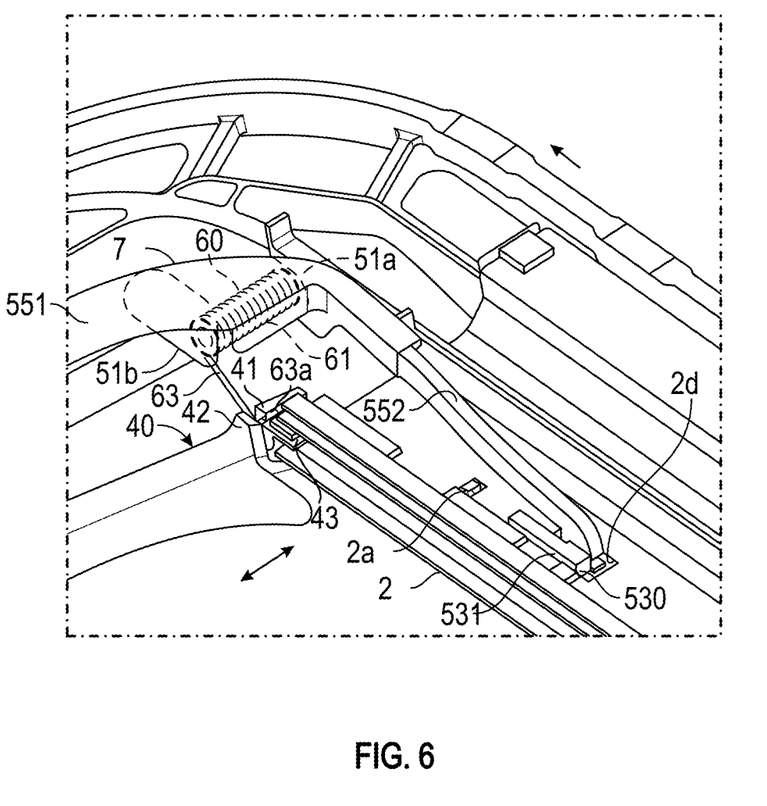
FIG. 6 is a perspective view of a front right portion of the sunroof vehicle in accordance with the teachings of this disclosure.

FIG. 6 illustrates a perspective view of a front right portion of the sunroof vehicle in accordance with the teachings of this disclosure.

In an embodiment, the deflector 7 has a windbreak portion 551 extending in the left-right direction of the vehicle and a pair of arm portions 552 extending to the rear of the vehicle continuously at both ends of the windbreak portion 551 in the left-right direction of the vehicle. The windbreak portion 551 has a positioning wall portion 51a arranged on the extension of the inner side surface of each arm portion 552 in the left-right direction of the vehicle in front of the vehicle, and is arranged on the extension of the spring holding portion 40 in front of the vehicle. The windbreak portion 551 has a positioning wall portion 51b. Both positioning wall portions 51a and 51b are arranged to face each other in the left-right direction of the vehicle.

In an embodiment, torsion coil spring 60 is installed on the windbreak portion 551 of the deflector 7. The torsion coil spring 60 is arranged between the two positioning wall portions 51a and 51b, and extends in the tangential direction from a coil portion 61 where a center line extends in the left-right direction of the vehicle and the outer portion of the coil portion 61 in the left-right direction of the vehicle to cut off the wind. The torsion coil spring 60 has a first end portion 62 locked to the windbreak portion 551 (e.g., positioning wall portion 51a) and a second end portion 63 extending in the tangential direction of the coil portion 61 from an inner end in the left-right direction of the vehicle. That is, the torsion coil spring 60 is arranged in order to shift from front ends of each arm portion 552 in the left-right direction of the vehicle, and is positioned and accommodated in the windbreak portion 551 by both positioning wall portions 51a, 51b and the like.

In an embodiment, a part of the windbreak portion 551 functions as a cover of the torsion coil spring 60. The second end portion 63 of the torsion coil spring 60 has a tip 63a bent outward in the left-right direction of the vehicle, and the torsion coil spring 60 has a second end portion 63 between the first and second side wall portions 41 and 42. The tip 63a is movably inserted into a guide recess 43 in the front-rear direction of the vehicle so as to be connected to the spring holding portion 40. The torsion coil spring 60 is, for example, on the side where the first end 62 rotates in the clockwise direction with respect to the second end 63 (e.g., tip 63a), that is, the first end 62 with respect to the second end 63. The torsion coil spring 60 raises the first end 62 while moving the tip 63a of the second end 63 toward the front of the vehicle along the guide recess 43 when the torsion coil spring 60 returns to its elasticity.

Figure 7:
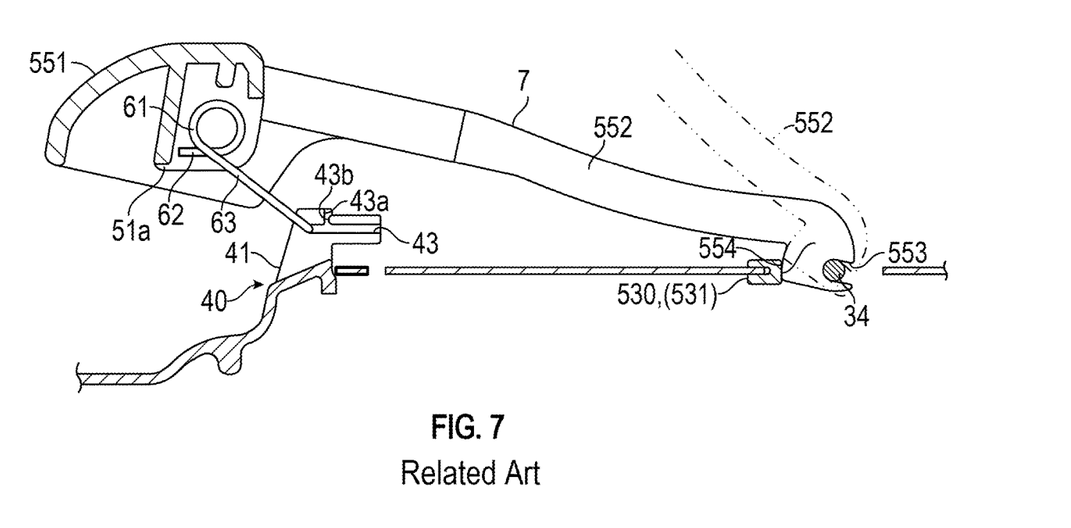
FIG. 7 is a cross-sectional view of the deflector in accordance with the teachings of this disclosure.

FIG. 7 illustrates a cross-sectional view of the deflector in accordance with the teachings of this disclosure.

In an embodiment, a vertical groove 43a is formed in the intermediate portion of the guide recess 43 in the longitudinal direction to open the guide recess 43 upward. At the lower end of the vertical groove 43a, a throttle portion 43b for narrowing the opening.

In an embodiment, at the rear end of each arm 552, a groove 553 is formed as an insertion portion through which the support pin 34 of the holder 30 is inserted so as to be relatively rotatable. The groove 553 is U-shaped which opens to the rear side of the vehicle and allows the support pin 34 to be inserted in the radial direction towards the axis of the support pin 34. Further, at the rear end of each arm 552, an arc shape is arranged on the rear side of the guide surface 35 of the holder 30 and is in contact with the guide surface 35 when the arm 552 rotates around the support pin 34. A contact surface 554 is formed. Therefore, at the rear end of each arm portion 552, the groove portion 553 is inserted into the support pin 34 so as to be relatively rotatable, and the contact surface 554 is in contact with the guide surface 35, whereby the support pin 34 and the guide surface 35 are in sliding contact with each other. It is assembled to the holder 30 so as to be sandwiched in the front-rear direction of the vehicle. As a result, the displacement of each arm portion 552 (e.g., deflector 7) in the vehicle front-rear direction is suppressed. Further, since the groove portion 553 extends above and below the support pin 34, the displacement of each arm portion 552 (e.g., deflector 7) in the vehicle vertical direction is also suppressed.

Figure 8A:
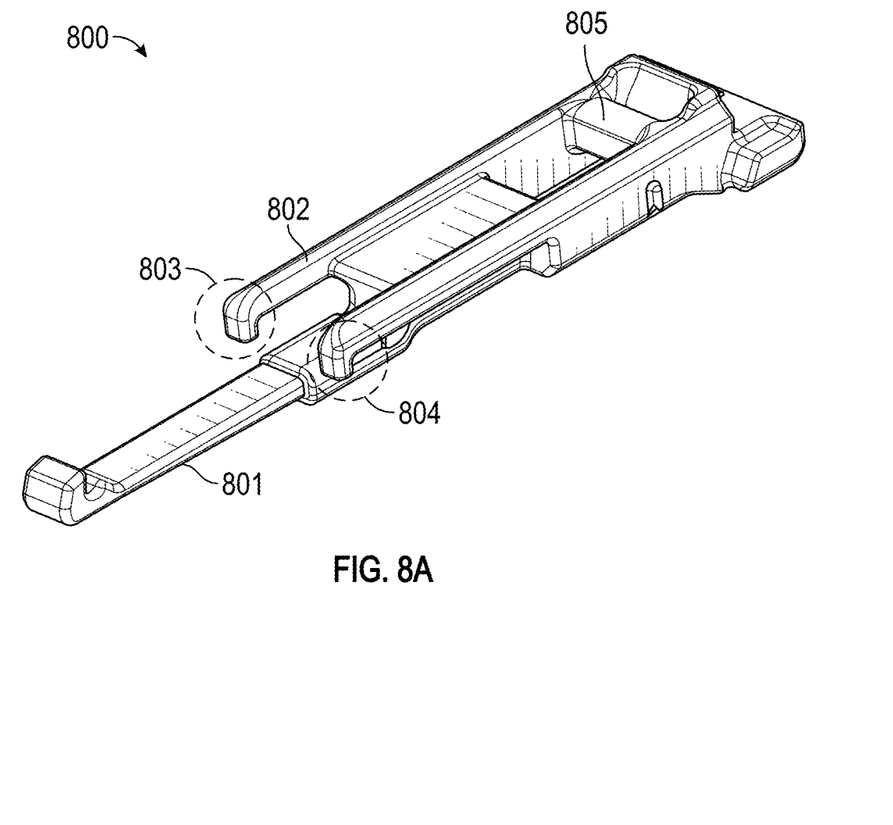
FIG. 8A illustrates a perspective view of a deflector holder in accordance with the teachings of this disclosure.

FIG. 8A illustrates a perspective view of a deflector holder 800 in accordance with the teachings of this disclosure. The deflector holder 800 includes a first restriction portion 801, a second restriction portion 802, and a rotation center 805. When the deflector 7 in FIG. 1A-FIG. 4 is erected, e.g., opened, movement of the deflector holder 800 in the deflector 7 is restricted by the first restriction portion 801 and the second restriction portion 802. The first restriction portion 801 including a tip 812. However, the movement of the deflector holder 800 restricted by the first restriction portion 801 and the second restriction portion 802 is insufficient, and the deflector holder move back and forth or left and right since the restriction from the first restriction portion 801 and the second restriction portion 802 is not stable. The deflector holder 800 may be adjacent to the bracket 21 mentioned earlier in FIG. 1A-FIG. 4.

In order to solve the above mentioned problems, claws 803 and 804 are added into the tips of the second restriction portions to make sure the movement of the deflector holder is restricted even when the deflector is erected, e.g., opened.

Figure 8B:
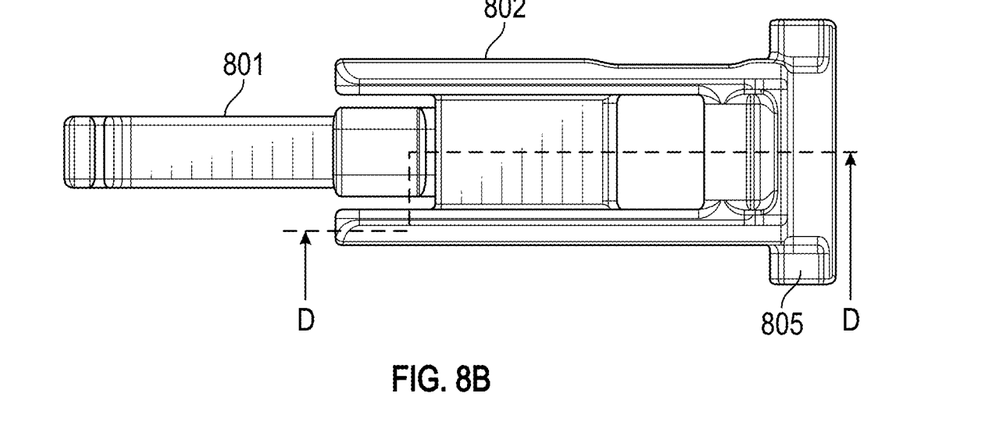
FIG. 8B illustrates a top view of the deflector holder in accordance with the teachings of this disclosure.
Figure 9A:
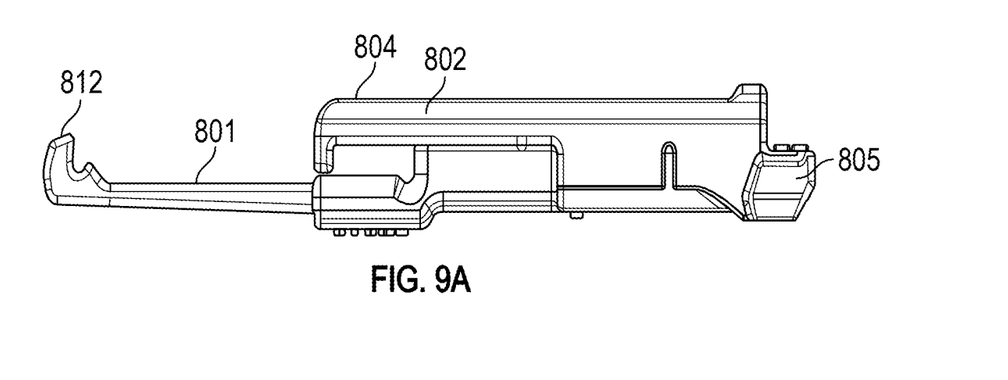
FIGS. 9A and 9B illustrate side views of the deflector holder in accordance with the teachings of this disclosure.
Figure 9B:
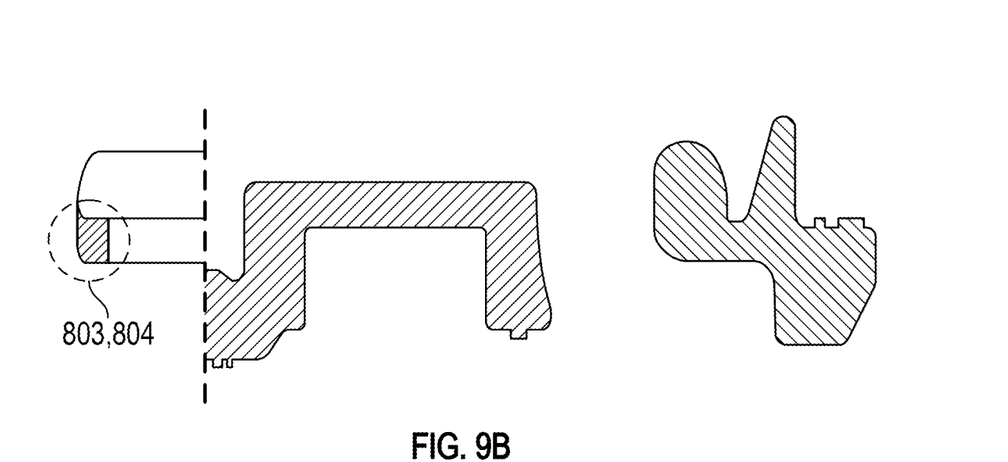

FIG. 8B illustrates a top view of the deflector holder 800 including the first restriction portion 801, the second restriction portion 802, and rotation center 805 in accordance with the teachings of this disclosure. FIG. 9A illustrates a side view of the deflector holder 800 in accordance with the teachings of this disclosure. As shown in FIG. 9A, the rotation center 805 is located at one end of the deflector holder and the tip 812 of the first restriction portion 801 is located at another end of the deflector holder 800. FIG. 9B illustrates a cross-sectional view of the deflector holder 800 in accordance with the teachings of this disclosure. The cross-sectional view of the deflector holder 800 includes claws 803 and 804 at the tips of the second restriction portion 802.

Figure 10:
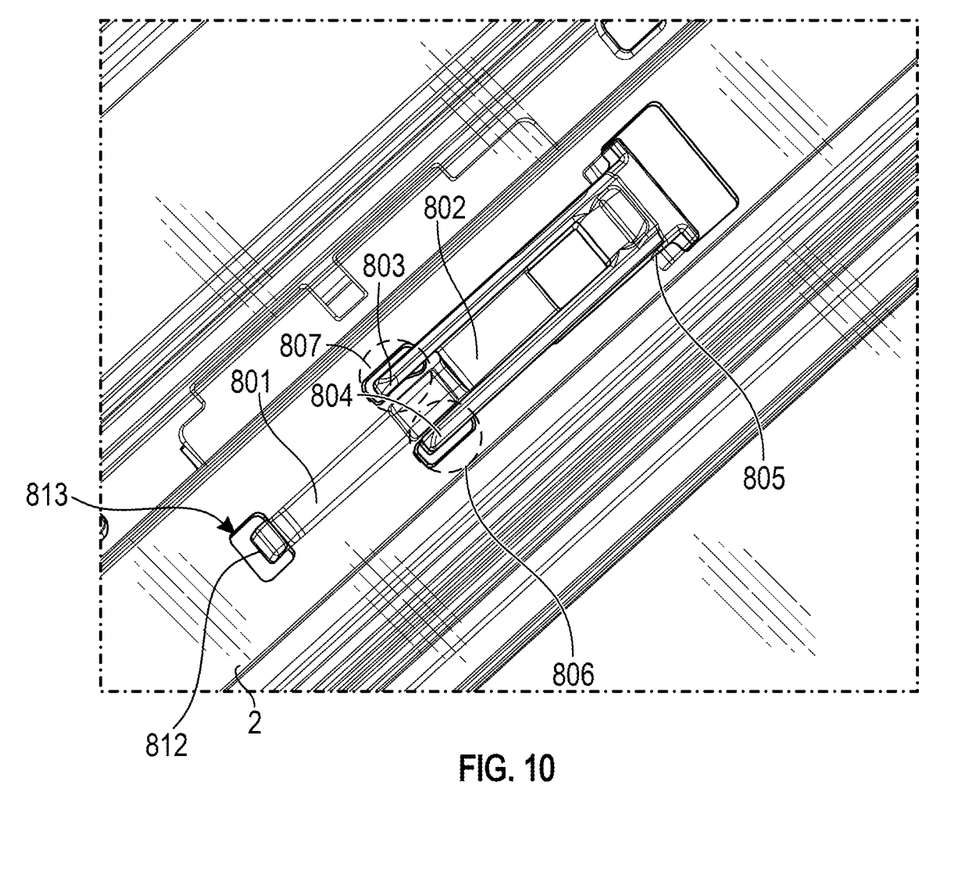
FIG. 10 illustrates a top view of the deflector holder connecting to the guide rail in accordance with the teachings of this disclosure.

FIG. 10 illustrates a top view of the deflector holder 800 connecting to the guide rail 2 in accordance with the teachings of this disclosure. In FIG. 10, the guide rail 2 is on top of the deflector holder 800.

Figure 11A:
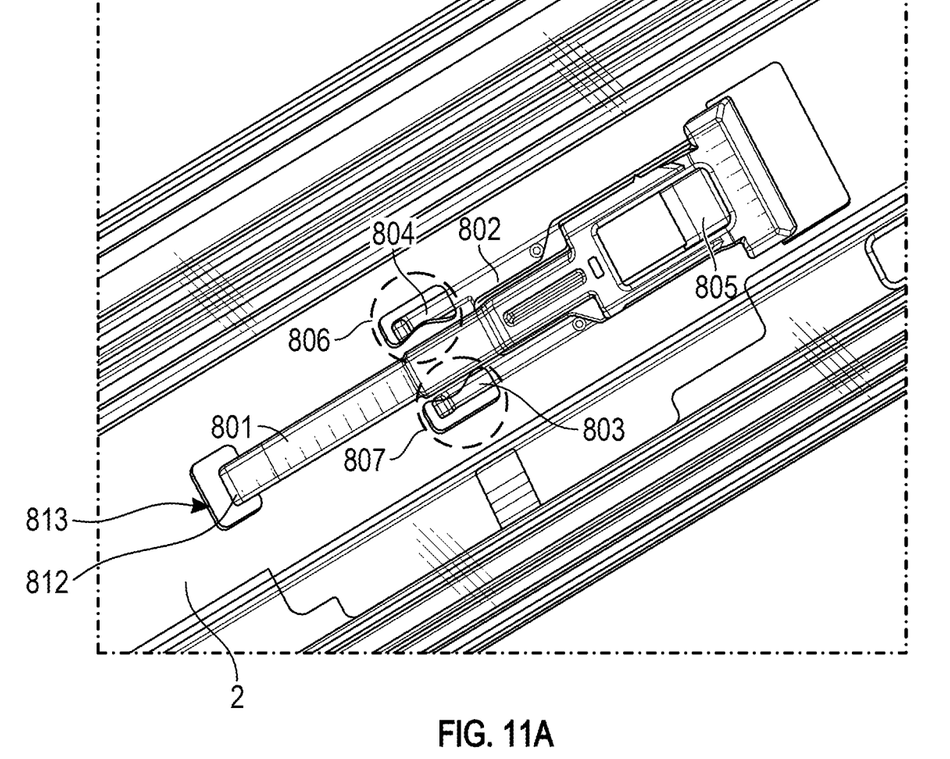
FIG. 11A illustrates a bottom view of the deflector holder connecting to the guide rail in accordance with the teachings of this disclosure.

FIG. 11A illustrates a bottom view of the deflector holder 800 connecting to the guide rail 2 in accordance with the teachings of this disclosure. In FIG. 10, the deflector holder 800 is on top of the guide rail 2. As described in FIG. 10, the guide rail 2 may include, but not limited to, holes 806, 807, and 813. The locations of the holes 806 and 807 may correspond to the locations of the claws 803 and 804 where the claws 803 and 804 may fit into the holes 806 and 807. The location of the hole 813 may correspond to the location of the tip 812. In some embodiments, the holes may be, but not limited to, circles, squares, ellipses, or triangles. The holes 806 and 807 may be designed such that the claws 803 and 804 are fitted into the holes 806 and 807. The claws 803 and 804 may have deflections.

Figure 11B:
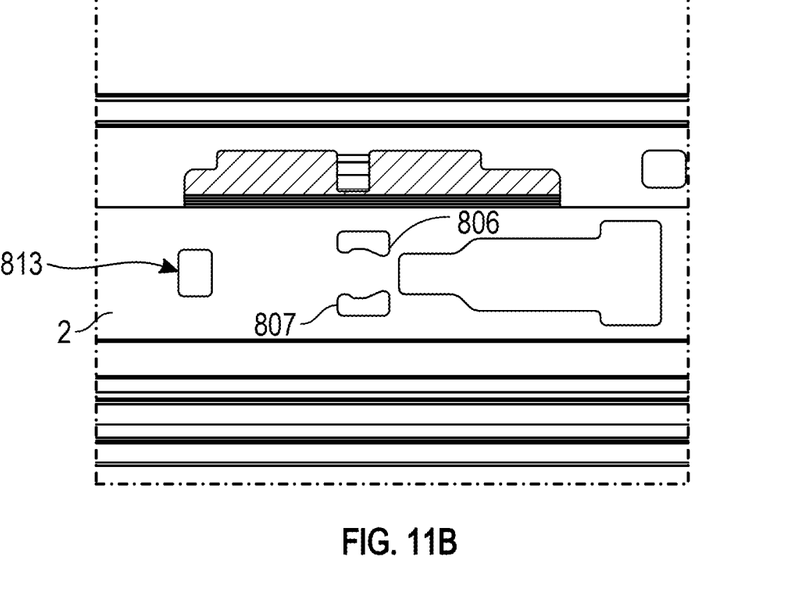
FIG. 11B illustrates a cross-sectional view of the guide rail including dimensions of the holes in accordance with the teachings of this disclosure.

FIG. 11B illustrates a cross-sectional view of the guide rail 2 including dimensions of the holes 806 and 807 in accordance with the teachings of this disclosure.

Figure 12A:
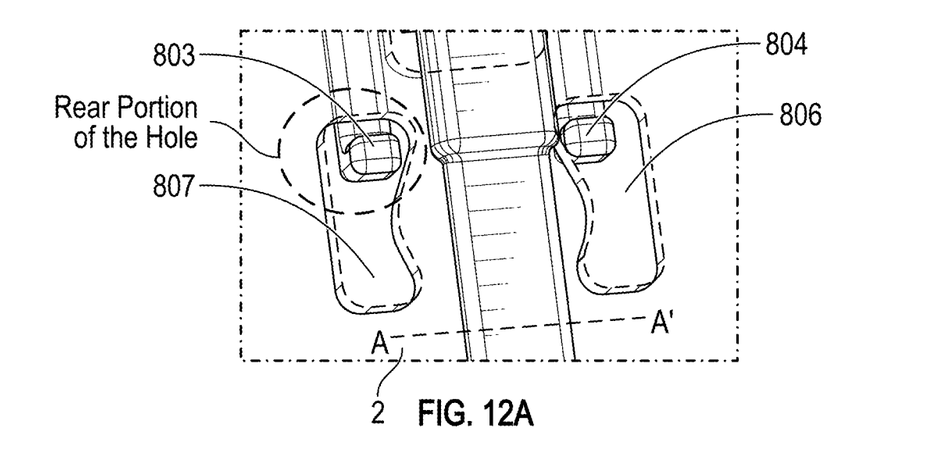
FIG. 12A illustrates a top view of the deflector holder connecting to the rear portion of the holes on the guide rail in accordance with the teachings of this disclosure.

FIG. 12A illustrates a top view of the deflector holder 800 connecting to the rear portion of the holes 806 and 807 on the guide rail 2 in accordance with the teachings of this disclosure. The deflector holder 800 connecting to the rear portion of the holes 806 and 807 may be at the beginning of the insertion of the deflection holder 800 to the guide rail 2. The rear portion of the holes 806 and 807 may have a sufficient width in a direction of A-A'. Therefore, the claws 803 and 804 may be inserted into edges of the holes 806 and 807.

Figure 12B:
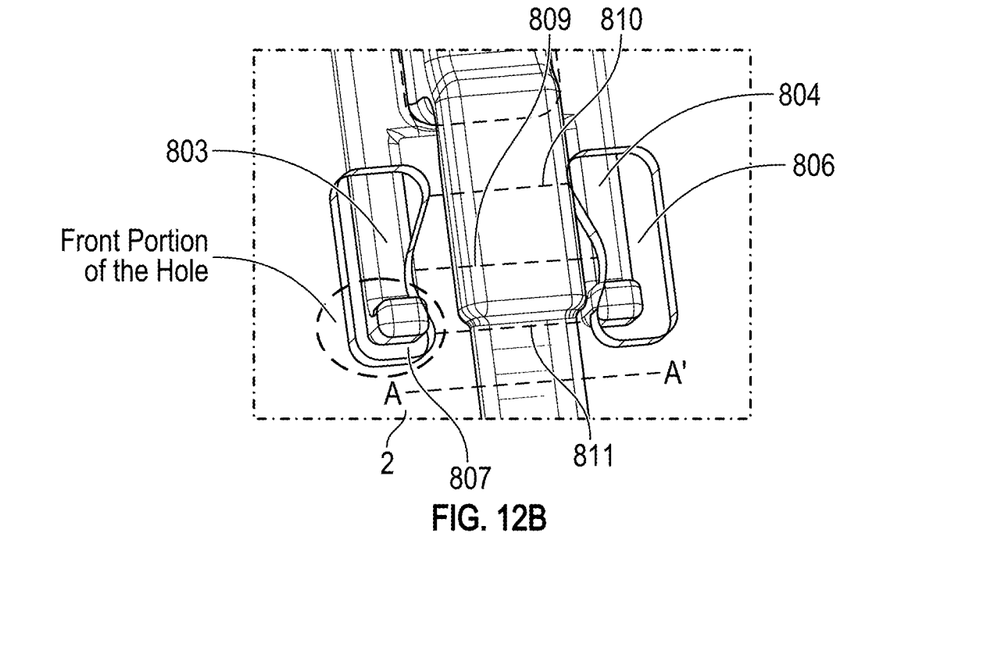
FIG. 12B illustrates a top view of the deflector holder connecting to the front portion of the holes on the guide rail in accordance with the teachings of this disclosure.

FIG. 12B illustrates a top view of the deflector holder 800 connecting to the front portion of the holes 806 and 807 on the guide rail 2 in accordance with the teachings of this disclosure. The deflector holder 800 connecting to the front portion of the holes 806 and 807 may be at the end of the insertion of the deflection holder 800 to the guide rail 2. In an embodiment, middle portions of the holes 806 and 807 are narrowed down from the rear portion of the holes 806 and 807 in the direction of A-A'. The middle portions of the holes 806 and 807 are then widened again in the direction of A-A' when it reaches the front portion of the holes 806 and 807.

In an embodiment, the middle portions of the holes 806 and 807 may have a curved shape, e.g., a convex shape. The width 809 on the guide rail 2 at the middle portions having the curved shape may be wider than the width 810 for the rear portions on the guide rail 2 or the width 811 for the front portions on the guide rail 2. The width 809 may be between 7.5 mm and 7.7 mm. The width 810 may be 5.4 mm. When the claws 803 and 804 move from the rear portions to the middle portions, the claws may move forward to the front portions of the holes 806 and 807 because of the curved shape of the holes at the middle portions.

In an embodiment, the front portions of the holes 806 and 807 have a width wider than the middle portions of the holes 806 and 807 in the direction of A-A'. The width of the front portion of the holes 806 and 807 may be larger than the width of the middle portion of the holes 806 and 807, but may still be shorter than the width of the rear portion of the holes 806 and 807.

In an embodiment, the claws 803 and 804 of the deflector holder 800 contact the guide rail 2 at the front portion of the holes 806 and 807. After the claws 803 and 804 move to the front portion of the holes 806 and 807, the claws 803 and 804 clamp the guide rail 2 at the front portions. If the claws 803 and 804 plan to move backward to the middle portions of the holes 806 and 807, the movement of the claws 803 and 804 is restricted due to the width 809 being wider than the width 811. The width 811 may be 6.3 mm.

Figure 13:
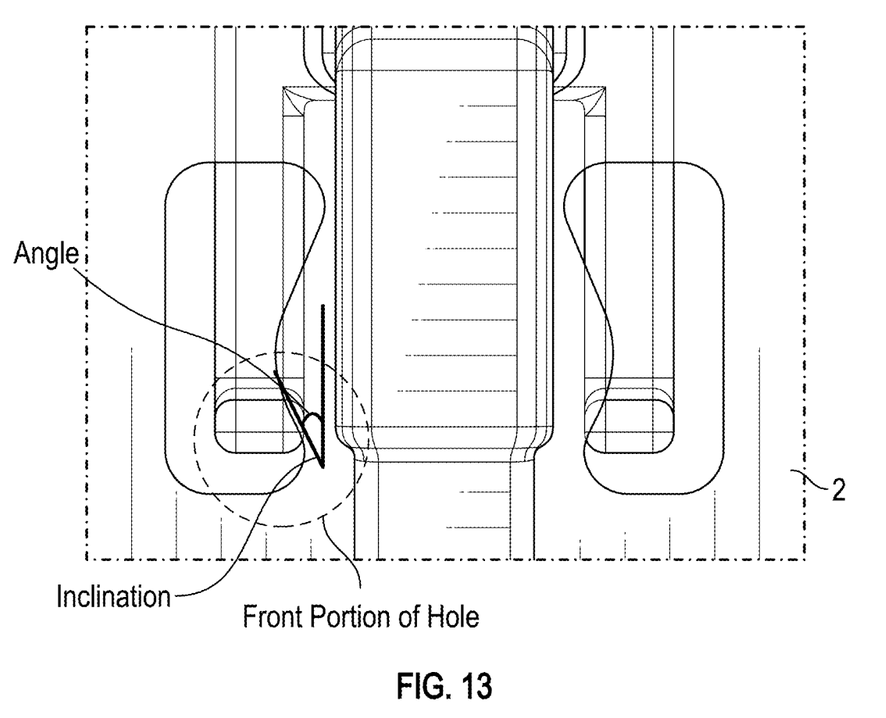
FIG. 13 illustrates a top view of the deflector holder connecting to the front portion of the holes on the guide rail in accordance with the teachings of this disclosure.

FIG. 13 illustrates a top view of the deflector holder 800 connecting to the front portion of the holes 806 and 807 on the guide rail 2 in accordance with the teachings of this disclosure. In an embodiment, an inner side of the front portion of the holes 806 and 807 may have an inclination. The angle of the inclination may be from 17.5 degrees to 27.5 degrees. The inclination may avoid the claws 803 and 804 moving from the front portions of the holes 806 and 807 back to the middle portions of the holes 806 and 807. The inclination may be beneficial for the restriction of the deflector holder 800 moving back and forth or right and left when the deflector is erected.

In an embodiment, the space on the guide rail 2 is limited. The shape of the holes 806 and 807 are designed to allow the insertion of the claws 803 and 804. The shape of the holes 806 and 807 are also designed to allow the movement and fitting of the claws 803 and 804 into the holes 806 and 807.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:
1. A sunroof device comprising:
 a movable panel on a roof of a vehicle;
 a guide rail including one or more holes;
 a deflector holder comprising a first restriction portion, a second restriction portion, and a rotation center, wherein:
  a first tip of the first restriction portion connecting to a first hole of the one or more holes;
  a second tip of the second restriction portion including a first claw, the first claw connecting to a second hole of the one or more holes;
  a third tip of the second restriction portion including a second claw, the second claw connecting to a third hole of the one or more holes, the second hole and the third hole including a front portion, a middle portion, and a rear portion, wherein:

a first width of the middle portion is smaller than a second width of the rear portion;

the first width is smaller than a third width of the front portion; and an inner surface between the front portion and the middle portion includes an inclination.

2. The sunroof device of claim 1, wherein the rotation center is located at an end of the deflector holder and the first tip of the first restriction portion is located at another end of the deflector holder.

3. The sunroof device of claim 1, wherein the rotation center of the deflector holder connects to the guide rail.

4. The sunroof device of claim 1, wherein the second restriction portion is located between the first restriction portion and the rotation center.

5. The sunroof device of claim 1, wherein the inclination has an angle of between 17.5 degrees and 27.5 degrees, the angle being between the inner surface and a direction from the middle portion to the front portion of the deflector holder.

6. The sunroof device of claim 1, wherein the first claw and the second claw connect to the rear portion at a beginning of an insertion of the first claw into the second hole and another insertion of the second claw into the third hole.

7. The sunroof device of claim 1, wherein the first claw and the second claw connect to the front portion at an end of the insertion of the first claw into the second hole and the other insertion of the second claw into the third hole.

\* \* \* \* \*